United States Patent [19]

Schaeper et al.

[11] Patent Number: 5,165,704
[45] Date of Patent: Nov. 24, 1992

[54] BLOWOUT PREVENTER BONNET SEAL CARRIER

[75] Inventors: Gary R. Schaeper, Houston; Marshall N. Montgomery, Katy, both of Tex.

[73] Assignee: Cooper Industries, Inc., Houston, Tex.

[21] Appl. No.: 831,926

[22] Filed: Feb. 6, 1992

[51] Int. Cl.⁵ .............................. F16J 15/02
[52] U.S. Cl. ................................... 277/214; 277/186
[58] Field of Search ................. 277/3, 186, 214, 215

[56] References Cited

U.S. PATENT DOCUMENTS

| | | | |
|---|---|---|---|
| 3,997,198 | 12/1976 | Linder | 285/98 |
| 4,437,643 | 3/1984 | Brakhage, Jr. et al. | 251/1 |
| 4,747,606 | 5/1988 | Jennings | 277/214 X |

Primary Examiner—John C. Fox

[57] ABSTRACT

A sealing structure for sealing between substantially aligned cylindrical surfaces including a seal carrier having a tubular body with external sealing ring grooves spaced apart so that sealing rings positioned in said grooves engage the cylindrical surface in sealing relationship and a relief groove in the central exterior of the seal carrier body to provide increased flexibility of the seal carrier body so that it can accommodate misalignment of the cylindrical surfaces and can respond to pressure differentials between the interior and exterior of the seal carrier body to reduce the extrusion gap between the seal carrier body and the cylindrical surfaces. The improved sealing structure of the present invention has a particular application for sealing between the bonnet and the body of a blowout preventer.

7 Claims, 5 Drawing Sheets

BLOWOUT PREVENTER BONNET SEAL CARRIER

BACKGROUND

Blowout preventers have a body and a pair of bonnets which are secured to the body. Rams are movably positioned in the body to move into an inner position blocking the central bore through the body and to an outer position within the body. Pistons positioned in the bonnets are connected by rods to the rams to function as the means for moving the rams. Seals are provided between the bonnets and body so that the pressure within the bonnets is contained therein.

U.S. Pat. No. 4,437,643 discloses a blowout preventer with a seal carrier positioned in a recess defined by the body and bonnet so that one of the sealing rings in the carrier seals against the body recess and the other sealing ring seals against the bonnet recess.

U.S. Pat. No. 3,997,198 discloses a swivel joint having a seal carrier for sealing between hubs 38 and 40 and is a generally tubular body with outer grooves therein to carry sealing ring for sealing against the recesses in the hubs in which the seal carrier 80 is positioned.

In such prior seal carriers it is difficult to provide proper sealing when there is a misalignment between the sealing surfaces. Where there is a misalignment and sealing is effected then there will be an increase in the extrusion gap on one side which may allow damage to the seal as a result of its extrusion between the carrier and the sealing surface.

SUMMARY

The present invention relates to an improved seal carrier for sealing between generally aligned cylindrical surfaces and in particular for sealing between the bonnet and body of a blowout preventer. The improved seal carrier is generally tubular in shape with its inner corners beveled slightly and having a pair of spaced apart, circumferential sealing grooves in its outer surface with a circumferential groove to allow flexing of the carrier in the outer surface between the two sealing grooves and adapted to be positioned generally in alignment with the interface between the two members being sealed.

An object of the present invention is to provide an improved seal carrier for sealing between annular surfaces which are in substantial alignment with each other which seal carrier can accommodate for misalignments of the sealing surfaces.

Another object is to provide an improved seal carrier for sealing between the bonnet sealing surface and the body sealing surface of a blowout preventer which has the ability to flex to assist in sealing against the surfaces when they are out of alignment.

A further object is to provide an improved seal carrier for sealing between the bonnet sealing surface and the body sealing surface of a blowout preventer which has the ability to flex to reduce the extrusion gap which is increased by misalignment of the sealing surfaces.

BRIEF DESCRIPTION OF THE DRAWINGS

These and other objects and advantages of the present invention are hereinafter set forth and explained with reference to the drawings wherein.

DESCRIPTION OF THE PREFERRED EMBODIMENTS

Figure 1:
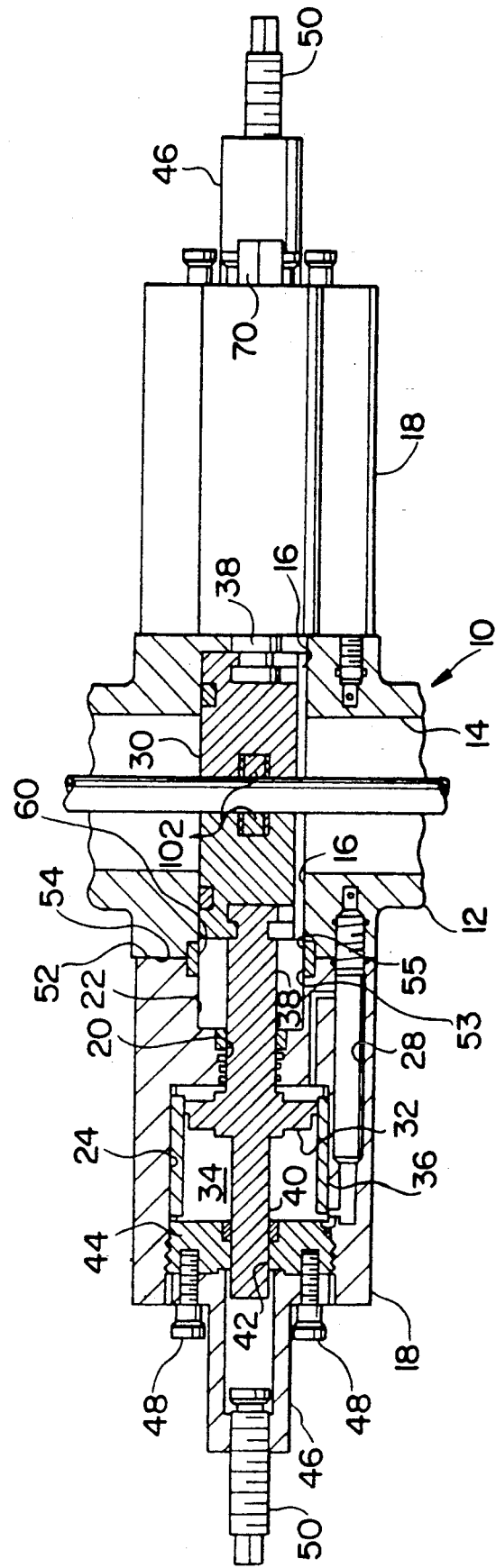
FIG. 1 is an elevation view of a blowout preventer which is partly in section to illustrate the joint between the bonnet and the body and the seal carrier positioned to seal such joint.

The blowout prevent 10 shown in FIG. 1 includes body 12 having vertical bore 14 therethrough and aligned opposed guideways 16 extending outwardly therefrom. Bonnets 18, which are secured to body 12 by suitable securing means, each include bore 20, aligned guideway extension 22 in communication with bore 20 and guideway 16, outer counterbore 24, side bores (not shown) extending through bonnet 18 in parallel relationship to bore 20 and opening 28 extending partially through bonnet 18. Rams 30 are slidably positioned in guideways 16 and are moved therein from their closed position in which they close bore 14 to their open position in which they are retracted into guideways 16.

The movement of each of rams 30 is responsive to hydraulic pressure applied to opposite sides of piston 32 in cylinder 34 formed within outer counterbore 24 by sleeve 36. Piston 32 is connected to ram 30 by rod 38 which extends through bore 20 and engages into the back side of ram 30 as shown. Rod 40 extends from the opposite side of piston 32 through bore 42 in closure plate 44 and terminates within cap 46. Closure plate 44 is threaded into the outer end of counterbore 24 and cap 46 is secured to plate 44 by cap screws 48. Stop 50 is threaded through cap 46 and is adjusted to be engaged by the end of rod 40 at the desired outer end of the opening stroke of piston 32 and ram 30. The additional structure of such a blowout preventer 10 is further described in U.S. Pat. No. 4,437,643.

As shown in FIG. 1, end surface 52 of bonnet 18 is positioned against surface 54 of body 12. One form of recess 53 in the interior of bonnet 18 mates with recess 55 in the interior of body 12 at the inner ends of surfaces 52 and 54. Recesses 53 and 55 are sized to receive seal carrier 60.

Figure 2:
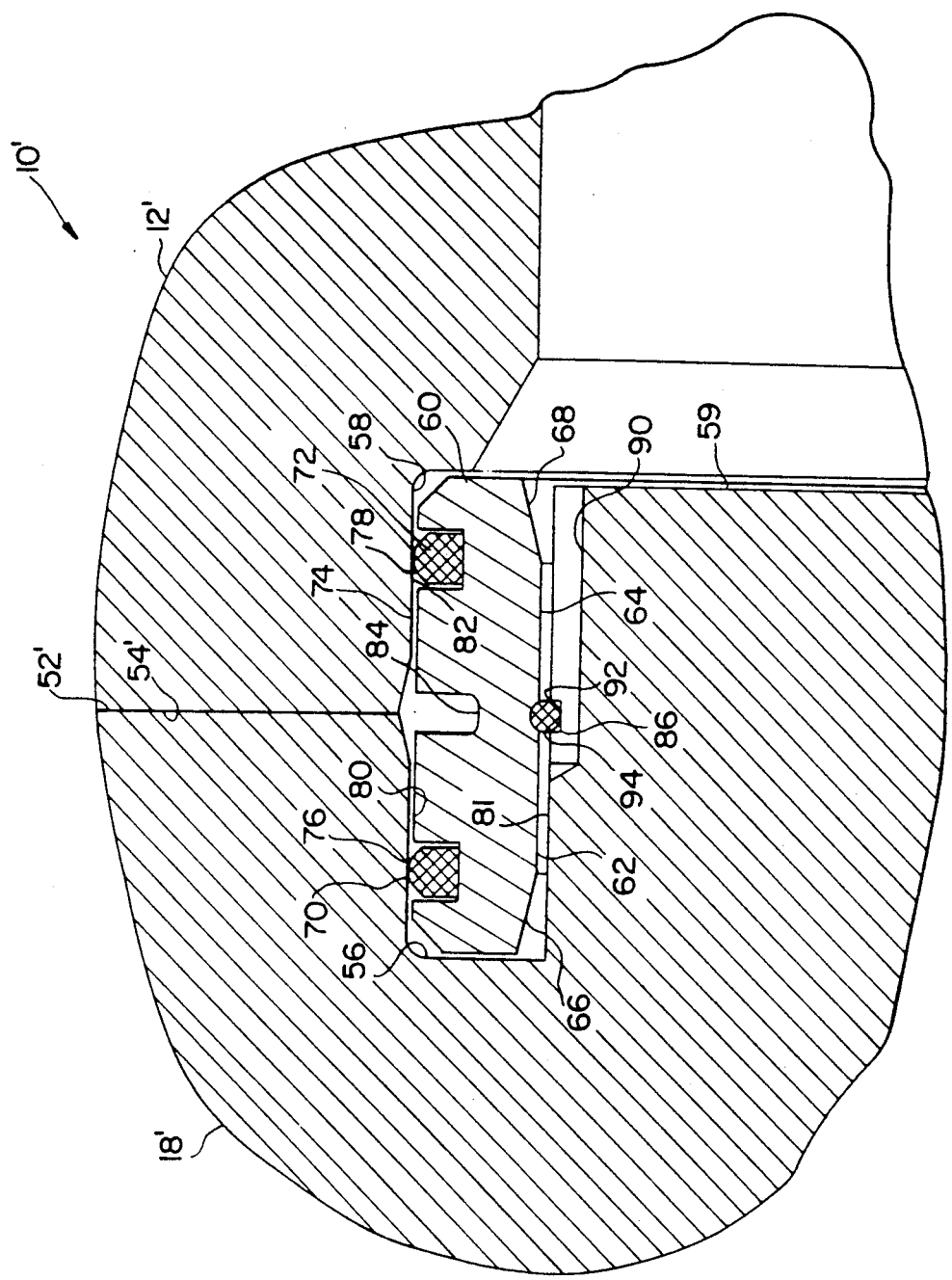
FIG. 2 is a partial detailed sectional view of the improved seal carrier of the present invention positioned to seal between the bonnet and body joint sealing surfaces of a blowout preventer when such surfaces are in alignment and prior to the application of pressure.

As shown in FIG. 2, another form of structure of the blowout preventer is shown in greater detail which includes end surface 52' of bonnet 18' positioned against end surface 54' of body 12'. Recess 56 in the interior of bonnet 18' mates with recess 58 in the interior of body 12' at the inner ends of surfaces 53' and 54'. Recess 56 is defined between sealing surface 80 and exterior surface 81 of projection 59 on bonnet 18 which is parallel to surface 80. Recesses 56 and 58 are sized to receive seal carrier 60. Seal carrier 60 has generally tubular body 62 with inner surface 64 which is beveled at each end at 66 and 68 and outer sealing ring grooves 70 and 72 in outer surface 74 which are spaced on opposite sides of the inner end of mating surfaces 52 and 54. Sealing rings 76 and 78 are positioned in grooves 70 and 72 with sealing ring 76 positioned to seal against sealing surface 80 of bonnet recess 56 and sealing ring 78 positioned to seal against sealing surface 82 of body recess 58. Central groove 84 is a circumferential groove positioned at the mid point between sealing ring grooves 70 and 72. Groove 84 is provided in seal carrier 60 so that body 62 has increased flexibility to allow the pressure on the interior of body 62, which creates a pressure differential on the portion of body 62 between sealing rings 76 and 78 to cause body 62 to move to accommodate some misalignment of surfaces 80 and 82 and also will flex to reduce the extrusion gap on the low pressure side of the carrier ring as hereinafter explained. Annular groove 86 is positioned in the central portion of the inner surface 64 of carrier body 62. Slot 90 extends axially on inner surface of recess 58 in bonnet 18' and annular groove 92 is positioned in such inner surface 58 in a position for receiving retainer ring 94 which is positioned partially in each of grooves 86 and 92. Slot 90 is deeper than groove 92 so that pressure is transmitted past retainer ring 94. It is suggested that retainer ring 94 be a suitable resilient ring, such as an 0 ring, which has a preselected size and resilience to retain seal carrier 60 in its desired position as shown. Retainer ring 94 by proper selection can be used as a retainer ring and also to provide a radial outward force on seal carrier 60. This force would urge seal carrier 60 radially outward to reduce the extrusion gap to which the pressure sealing rings 76 and 78 are exposed. Slot 90 allows wellbore fluid to pass under the seal carrier creating a pressure balancing between the ends of seal carrier 60.

Figure 3:
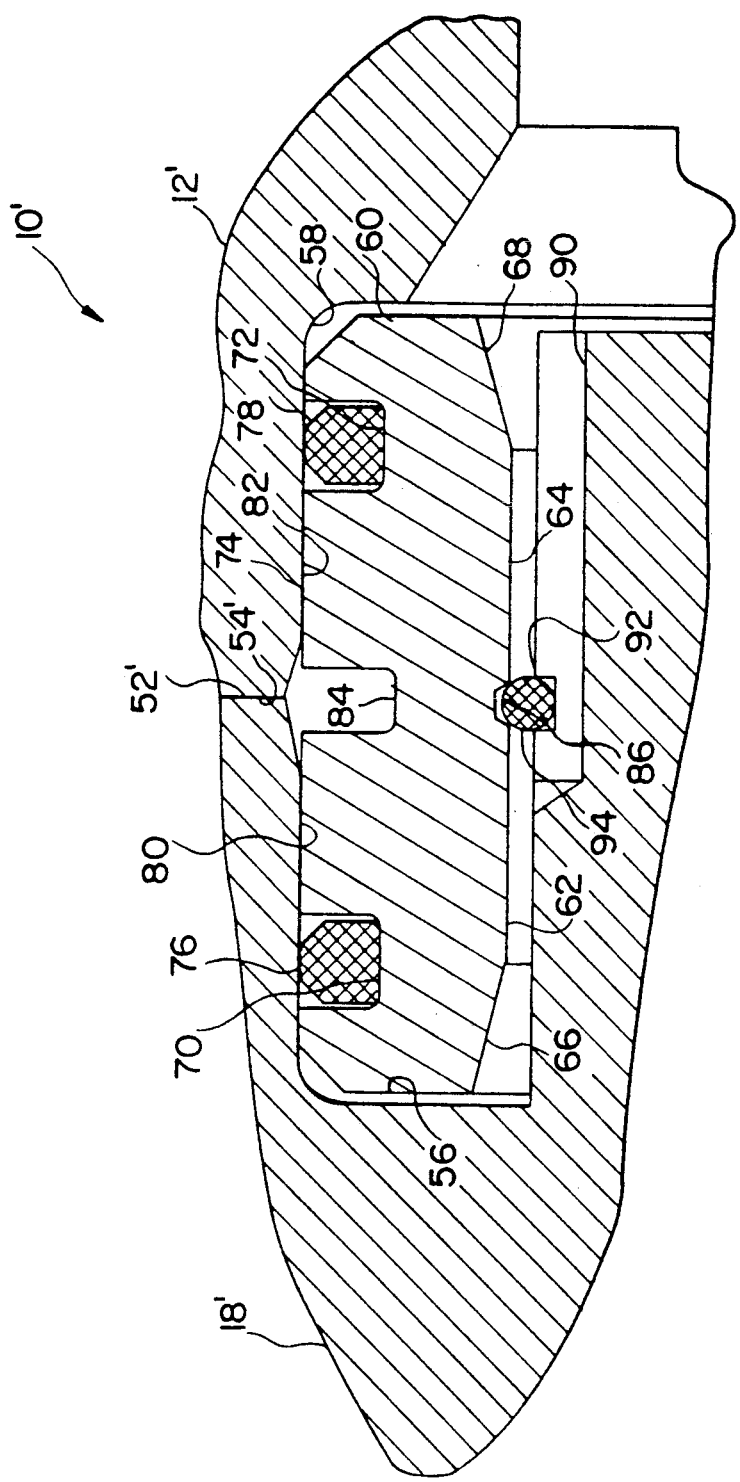
FIG. 3 is a view similar to FIG. 2 of the structure shown therein and illustrating the sealing after pressure has been applied.

As shown in FIG. 3, when sealing surfaces 80 and 82 are in alignment and pressure has been applied, such pressure is applied over the inner surface of seal carrier 60 and since the outer surface of seal carrier 60 between sealing rings 76 and 78 is exposed to atmospheric pressure from the exterior of the structure, the pressure differential urges seal carrier 60 radially outward to the sealing position shown and with seal carrier 60 being either in engagement with sealing surfaces 80 and 82 or so close thereto as to reduce the extrusion gap to such a small dimension as to limit possible extrusion.

Figure 4:
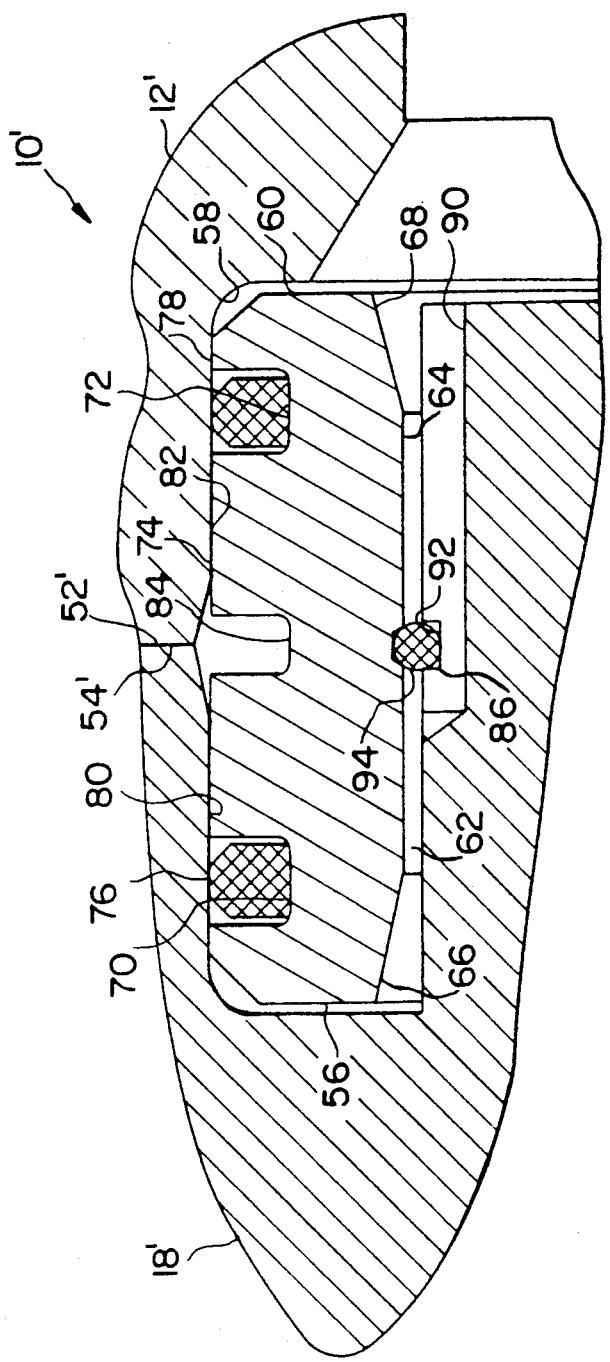
FIG. 4 is a sectional detail view of the improved seal carrier illustrating its flexing to reduce the extrusion gap on the low pressure side of the sealing rings.

When there is a misalignment between the sealing surfaces 80 and 82 and pressure is exerted on the interior of seal carrier 60, seal carrier is again urged radially outward so that it is positioned as shown in FIG. 4. It should be noted as shown in the figure that one portion of seal carrier 60 is against sealing surface 82 and the other is spaced from surface 80. The outward flexing of seal carrier 60 responsive to the pressure differential will move it closer to surface 80 so that the extrusion gap is minimized.

The flexing of seal carrier 60 is illustrated in FIG. 4. Central groove 84 is shown in a central position with respect to the junction between bonnet surface 52' and body surface 54'. With seal carrier 60 being under pressure it will flex such that the central portion of body 62 moves outwardly and that moves the ends of outer surface 74 adjacent to groove 84 into close proximity with respect to surfaces 82 and 80 to thereby reduce the gap therebetween which effectively reduces the extrusion gap on the low pressure side of sealing rings 76 and 78. With this flexibility of seal carrier 60 it will adjust to misalignments between the sealing surfaces of the bonnet and body and will be responsive to pressure to reduce the extrusion gap on the low pressure side of the sealing rings.

Figure 5:
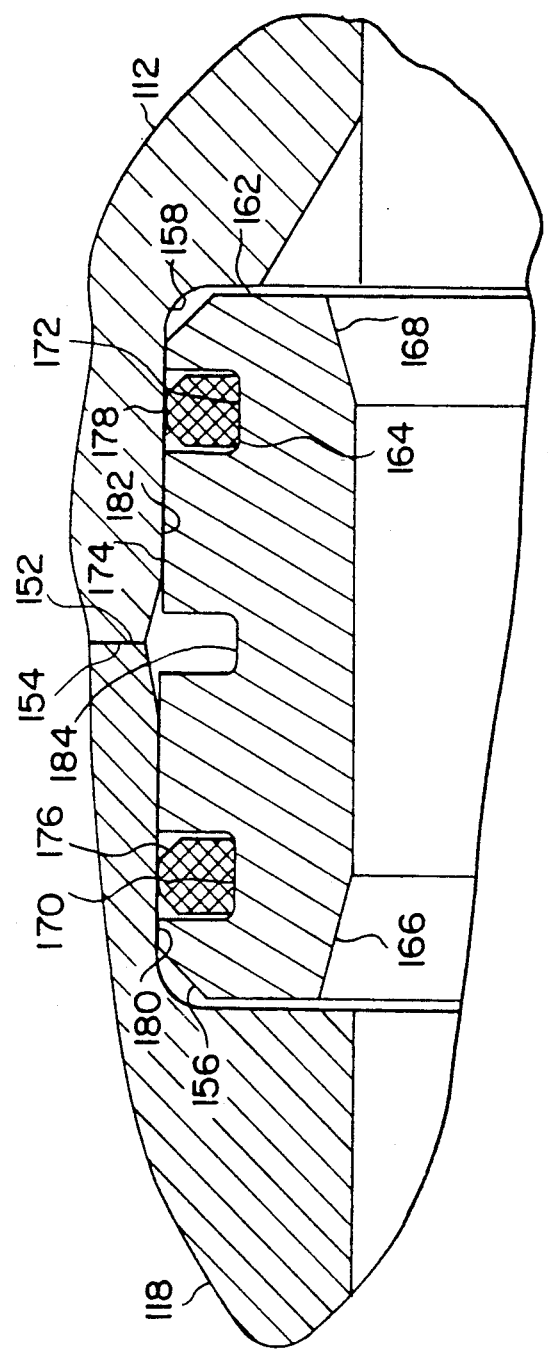
FIG. 5 is a partial detailed sectional view of another form of joint in which the improved carrier of the present invention is to be used.

As shown in FIG. 5, body 112 is positioned with its end surface 154 in engagement with end surface 152 of bonnet 118. Body recess 158 includes sealing surface 182 and body recess 156 includes sealing surface 180. Seal carrier 160 positioned in recesses 156 and 158 as shown. Seal carrier 160 includes tubular body 162 having inner surface 164 with its ends beveled at 166 and 168 and circumferential outer sealing ring grooves 170 and 172 in outer surface 174 of body 162 and sealing rings 176 and 178 are positioned in grooves 170 and 172. Sealing ring 176 is positioned to seal against sealing surface 180 and sealing ring 178 is positioned to seal against sealing surface 182. Circumferential groove 184 is provided in seal carrier 160 at the approximate midpoint of surface 164. The flexing of seal carrier 160 is similar to that of carrier 60 shown in FIG. 4 and described with respect thereto.

What is claimed is:

1. A sealing structure for sealing between two members each of which has cylindrical sealing surface which is in substantial alignment with the other sealing surface comprising
    a seal carrier having a tubular body with an inner surface and an outer surface,
    said outer surface being smaller in diameter than the cylindrical surfaces,
    a pair of grooves in said outer surface which are spaced apart a preselected distance which is at least sufficient to place each groove facing one of said sealing surfaces,
    a sealing ring positioned in each of said pair of grooves for sealing against said surfaces, and
    a circumferential relief groove in said outer surface between said sealing ring grooves to provide an increased flexibility of said body to flex responsive to pressure exerted on the interior of said tubular body in the area opposite to the space between said sealing ring grooves to reduce the extrusion gap between the cylindrical surfaces and said tubular body on the low pressure side of said sealing rings.

2. A sealing structure according to claim 1 wherein said cylindrical sealing surfaces are on the body and bonnet of a blowout preventer.

3. A sealing structure according to claim 2 wherein one of said bonnet and said body includes a projection of smaller diameter and generally parallel to said cylindrical surfaces for receiving said seal carrier.

4. A sealing structure according to claim 3 including means for retaining said seal carrier in its desired position between the exterior of said projection and said cylindrical surfaces.

5. A sealing structure according to claim 4 wherein said retaining means includes
    opposing grooves in registry with each other on the interior of said seal carrier and the exterior of said projection, and
    a resilient ring positioned in said registering opposed grooves to retain said seal carrier in its desired position.

6. A sealing structure according to claim 5 including means for equalizing pressure across said resilient retaining ring.

7. A sealing structure according to claim 6 wherein said pressure equalizing means includes
    a groove in said projection exterior between opposite sides of said resilient ring.

* * * * *